Jan. 11, 1927.

J. A. DALEY 1,614,349

MEAT HANGER

Filed Feb. 5, 1925

James A. Daley Inventor

By Charles W. Lovett
Attorney

Patented Jan. 11, 1927.

1,614,349

UNITED STATES PATENT OFFICE.

JAMES A. DALEY, OF HANSON, MASSACHUSETTS.

MEAT HANGER.

Application filed February 5, 1925. Serial No. 6,983.

My invention relates to hangers designed particularly for use in suspending hams, shoulders, pork butts, spare ribs, beef sets, beef tongues, and such other cuts of meat as are put through the curing process of smoking.

The objects of my invention are to eliminate the use of inflammable cord or rope hangers heretofore commonly used in the industry; to thereby minimize possibility of fire; to minimize hanger cost; to eliminate waste; to eliminate the so-called stringing; to conserve the time heretofore expended inserting and tying cord or rope hangers, and to provide a new and improved hanger designated to readily engage and securely hold the meat to be suspended, said holder providing due flexibility for free and easy handling.

Figure 1:
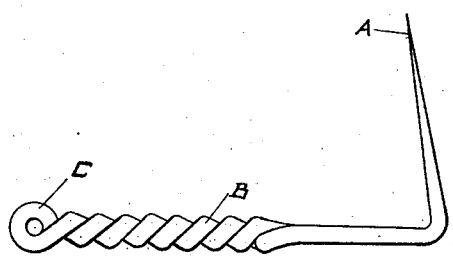
Figure 3:
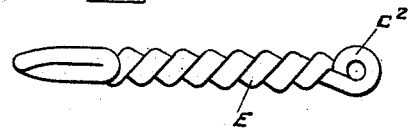
Figure 2:
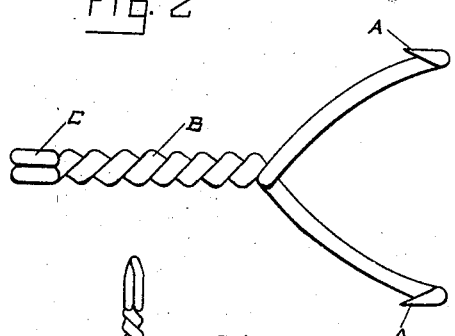
Figure 4:
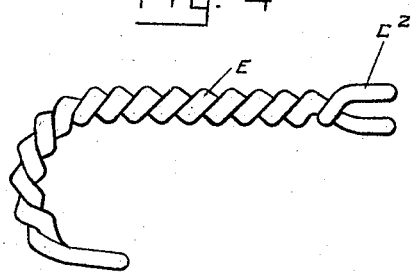
Figure 5:
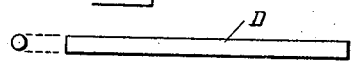
Figure 6:
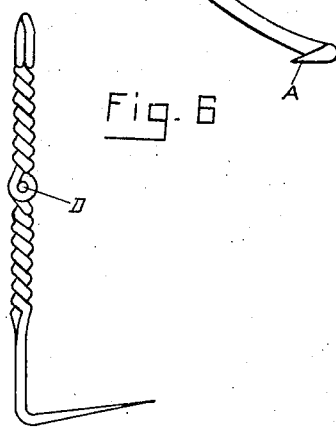
Figure 7:
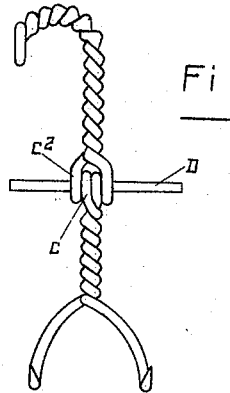

I accomplish the objects of my invention as shown in the accompanying drawings which form a part of this specification, and in which Figure 1 shows a side view of the hook member of my device. Figure 2 shows a front view of said hook member. Figure 3 shows a side view of the hanger unit of my device. Figure 4 shows a front view of the hanger unit. Figure 5 shows the handle member on which the hook and hanger units respectively hinge as shown in Figure 6. Figure 7 shows a view of my assembled device at right angles with the view shown in Figure 6.

Referring again to Figures 1 and 2, A shows the meat engaging prongs on the hook member B. $C^2$ shows the hinge which engages the handle member D shown in Figure 5. Referring to Figures 3 and 4, $C^2$ shows the hinge of the hanger unit E, which hinge engages the handle member D as shown in Figure 5. The hook portion of the hanger unit E, is designed to readily engage the smoke tree, so-called, during the smoking process. Similar letters of reference refer to similar parts throughout the various views.

In use, while one of the operator's hands grip the handle D, the prongs A are pressed into the meat to be held. The flexibility of the device then allows the operator to readily and easily engage the smoke tree with the hook F, thus securely suspending the meat for the smoking process.

My device is satisfactorily made from wire of appropriate size, but any other suitable material may be used.

While I have illustrated and described a preferred construction for carrying my invention into effect, this is capable of variation or modification without departing from the spirit of the invention. I therefore do not wish to be limited to the exact details of the construction herein set forth but desire to avail myself of such variations and modifications as come within the scope of the appended claims.

Having thus described my invention I claim as new and desire to secure by Letters Patent of the United States of America:

1. An appliance for handling and suspending meats and the like, comprising a pair of elongated elements, a hook device formed on one of the ends of each of the elements, means on the remaining ends of the elements forming an interfitting connection between said elements, and an elongated member removably projecting through said interfitting connection at the ends of the elements and extending substantially transversely of the longitudinal axes of the elements to positively and hingedly attach the elements together and provide a handle for said elements.

2. An appliance for handling and suspending meats and the like comprising a pair of elements, a hook device formed on one of the ends of each element, the remaining end of one element provided with an eye, the remaining end of the other element being bifurcated to form arms each having an eye, and adapted for interfitting engagement with the end of the other element with the respective eyes registering, and an elongated member removably projecting through the registering eyes of said elements and extending substantially transversely to the longitudinal axes of the elements to provide a positive hinged connection between the elements and to form a handle.

3. An appliance for handling and suspending meats and the like comprising a pair of elements, each element formed of a single strand of wire twisted about itself to form an elongated body, and bent to provide on one of the ends of the body a hook device, the remaining end of one element having an eye, and the strand of wire forming the other element being bent at the remaining end thereof to form a pair of arms each having an eye, said arms adapted for interfitting connection with the end of the other element having the eye, and said eyes adapted to register, and an elongated member removably projecting through the registering eyes of said elements and extending substantially transversely to the longitudinal axes of the body portions of the elements to provide a hinged connection therebetween and form a handle.

In testimony whereof I affix my signature.

JAMES A. DALEY.